United States Patent [19]

Ogawa et al.

[11] Patent Number: 4,963,433
[45] Date of Patent: Oct. 16, 1990

[54] MAGNETIC RECORDING MEDIUM

[75] Inventors: Hiroshi Ogawa; Yasuo Tamai; Toshio Kawamata, all of Kanagawa, Japan

[73] Assignee: Fuji Photo Film Co., Ltd., Kanagawa, Japan

[21] Appl. No.: 372,177

[22] Filed: Jun. 27, 1989

Related U.S. Application Data

[63] Continuation of Ser. No. 152,221, Feb. 4, 1988, abandoned.

[30] Foreign Application Priority Data

Feb. 4, 1987 [JP] Japan ................................. 62-22580

[51] Int. Cl.$^5$ .............................................. G11B 5/64
[52] U.S. Cl. ................................... 428/323; 427/131; 428/694; 428/900
[58] Field of Search ................ 427/131; 428/323, 694, 428/900

[56] References Cited

U.S. PATENT DOCUMENTS

| | | | |
|---|---|---|---|
| 3,730,767 | 5/1973 | Akashi | 428/412 |
| 3,730,768 | 5/1973 | Pause | 210/498 |
| 4,275,113 | 6/1981 | Saito | 428/323 |
| 4,487,802 | 12/1984 | Miyoshi | 428/336 |
| 4,504,542 | 3/1985 | Miyoshi | 428/336 |
| 4,540,618 | 9/1985 | Suzuki | 428/900 |
| 4,615,930 | 10/1986 | Matsumoto | 428/900 |
| 4,617,226 | 10/1986 | Yamaguchi | 428/900 |
| 4,664,975 | 5/1987 | Kobayashi | 428/900 |

Primary Examiner—Paul J. Thibodeau
Attorney, Agent, or Firm—Sughrue, Mion, Zinn, Macpeak & Seas

[57] ABSTRACT

A magnetic recording medium comprising a non-magnetic support having provided thereon an underlayer containing non-magnetic particles and a binder and an upper layer containing ferromagnetic particles and a binder, wherein the underlayer contains a thermoplastic binder and has a dry thickness of 0.5 μm or more.

8 Claims, 1 Drawing Sheet

MAGNETIC RECORDING MEDIUM

This is a continuation of application Ser. No. 07/152,221, filed Feb. 4, 1988 now abandoned.

FIELD OF THE INVENTION

The present invention relates to a magnetic recording medium having a non-magnetic layer as an underlayer, and more particularly it relates to a magnetic recording medium having improved electromagnetic properties, running properties, and durability.

BACKGROUND OF THE INVENTION

Magnetic recording media comprising a non-magnetic support having provided thereon a magnetic layer containing ferromagnetic iron oxide, Co-modified ferromagnetic iron oxide, $CrO_2$, or ferromagnetic alloy particles dispersed in a binder have conventionally been used as video tapes, audio tapes, magnetic disks and the like.

In recent years, demands for higher density recording has been realized and recording wavelengths have been shortened. Thus, spacing loss upon recording and reproducing (i.e., outputs are decreased due to a thick magnetic layer) has become a serious problem.

In view of the above, the thickness of a magnetic layer has been reduced. However, if a magnetic layer has a thickness of about 2 μm or less, the surface of the magnetic layer is readily affected by the surface properties of the support, thereby deteriorating electromagnetic properties.

A thick non-magnetic underlayer is provided on a support and a magnetic layer is thereafter provided thereon as an upper layer to prevent the magnetic layer from being affected by the surface roughness of the support. However, head wear-out property and durability in this case are not satisfactory and further improvements are necessary.

The above-described conventional non-magnetic underlayer uses thermosetting (hardenable type) resins as a binder. Therefore, since the underlayer is hardened, the magnetic layer contacts with a magnetic head or other equipment parts without buffer conditions, and the magnetic recording medium having such a hardened underlayer has rather poor plasticity.

In order to avoid the above problems, it has been proposed that non-hardenable (thermoplastic) resins be used in the underlayer. However, when a magnetic layer is provided as an upper layer after such an underlayer is provided and dried, the underlayer is swollen by the organic solvents contained in the coating solution for the upper layer which causes disturbance in the coating solution used for the upper layer, thereby deteriorating surface properties of the magnetic layer and decreasing the electromagnetic properties. Accordingly, it has been believed that the underlayer should not use a nonhardenable binder.

SUMMARY OF THE INVENTION

An object of the present invention is to provide a magnetic recording medium having improved electromagnetic properties, running properties, and durability, which is free from the above problems.

More particularly, an object of the present invention is to provide a magnetic recording medium having a non-magnetic layer as an underlayer and a relatively thin magnetic layer as an upper layer, that has improved electromagnetic properties, running properties, and durability.

Other objects of the present invention will be apparent from the following description.

As a result of extensive investigations to solve the above problems, the inventors of the present invention have found that the invention hereinafter described could attain the above objects.

That is, the present invention provides a magnetic recording medium comprising a non-magnetic support having provided thereon an underlayer containing non-magnetic particles and a binder and an upper layer containing ferromagnetic particles and a binder, wherein the under layer contains a thermoplastic binder and has a dry thickness of 0.5 μm or more.

Furthermore, it has been found that a magnetic recording medium having excellent electromagnetic properties at high frequency ranges and suitable for high density recording and without having the above-described problems can be obtained by coating a coating solution for an underlayer containing thermoplastic and non-hardenable resin(s) as the binder, non-magnetic particles as hereinafter described and organic solvents by a wet-on-wet coating method simultaneously with or sequentially before a coating solution for a magnetic layer.

DETAILED DESCRIPTION OF THE INVENTION

Figure 1:
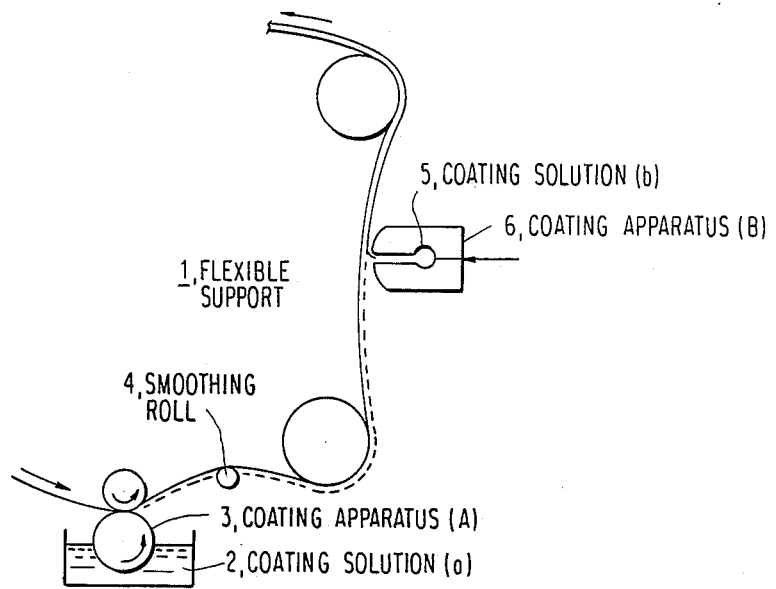
FIG. 1 is a drawing explaining a exemplary sequential coating method for coating an underlayer and an upper layer by a wet-on-wet method.

The present invention is hereinafter illustrated in more detail.

The suitable binders used in the non-magnetic underlayer of the present invention are non-hardenable thermoplastic resins which do not contain a hardening agent (component to cause a hardening reaction) such as polyisocyanate.

Examples of the thermoplastic resin include a vinyl chloride/vinyl acetate copolymer resin, a vinyl chloride/vinyl acetate copolymer resin containing functional groups, an acrylate type copolymer, a methacrylate type copolymer, a saturated polyester resin, a polyurethane resin, a polyurethane resin containing functional groups, and a cellulose type resin. A vinyl chloride/vinyl acetate copolymer resins containing functional groups, a polyurethane resin, and a polyurethane resin containing functional groups are particularly preferred. Preferred examples of the functional groups include —$SO_3M$, —COOM, —OM, and

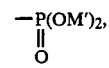

wherein M represents a hydrogen atom or an alkali metal, and M' represents a hydrogen atom an alkali metal, or a hydrocarbon group.

The preferred polyurethane resins include a polyester polyurethane, a polyether polyurethane, a polyesterether polyurethane, a polycaprolactone polyurethane, and a polycarbonate polyurethane.

Examples of the non-magnetic particles used in the underlayer of the present invention include carbon black, graphite, titanium oxide, barium sulfate, ZnS, MgCO$_3$, ZnO, CaO, α-iron oxide, tungsten disulfide, molybdenum disulfide, boron nitride, MgO, SnO$_2$, SiO$_2$, Cr$_2$O$_3$, α-Al$_2$O$_3$, SiC, cerium oxide, corundum, artificial diamond, α-iron oxide, garnet, silica, silicon nitride, boron nitride, silicon carbide, molybdenum carbide, boron carbide, tungsten carbide, titanium carbide, diatom earth, dolomite, bentonite, and organic bentonite. The preferred non-magnetic particles include inorganic particles such as carbon black, CaCO$_3$, titanium oxide, barium sulfate, α-A$_2$O$_3$, α-iron oxide or γ-iron oxide and polymer particles such as polyethylene or benzoguanamine resins.

These non-magnetic particles are generally used as abrasive agent in this field of art. When the nonmagnetic particles are granular, they preferably have a diameter of from 1 to 1,000 mμ (millimicron), more preferably from 1 to 500 mμ. When they are acicular, the long axis thereof is preferably from 100 mμ to 5 μm (micrometer), more preferably from 100 mμ to 3 μm, and the short axis thereof is preferably from 1 to 1,000 mμ, more preferably from 1 to 500 mμ.

The thermoplastic resin (binder) used in the underlayer is preferably used in an amount of from 10 to 200 parts by weight, more preferably from 20 to 100 parts by weight, per 100 parts by weight of the non-magnetic particles.

The thickness of 0.5 μm or more is necessary for the underlayer to mask the surface roughness of the support and a thickness of from 0.5 μm to 5 μm is generally used. If the underlayer does not contain nonmagnetic particles, it is not effective enough to mask the surface roughness of the support.

The light-transmission degree of the underlayer is preferably 10% or less at a wavelength of 900 nm. If it is more than 10%, VTR and DAT decks which detect the end of the tape by light transmission degree readily malfunction.

The surface electric resistance of the underlayer is preferably $10^{10}$Ω/square or less to prevent dropouts. Therefore, it is preferred that electroconductive particles such as carbon or non-magnetic metal particles and light-intercepting particles are included in the underlayer in an amount of 5 wt% or more based on the nonmagnetic particles.

A non-magnetic under coated layer is generally provided in a magnetic recording medium as described in U.S. Pat. Nos. 3,730,767 and 4,504,542. It is provided to increase adhesiveness between a support and a magnetic layer, and has a thickness of about 0.2 μm or less. Such is different from the underlayer of the present invention. However, an under coated layer may also be provided in the present invention in order to improve adhesiveness between the underlayer and the support.

The binder used in the upper magnetic layer include thermosetting resins, thermoplastic resins, reactive type resins, and mixtures thereof, which are conventionally known as binders for a magnetic recording medium. Such binders include, for example, copolymers of vinyl chloride and vinyl acetate, acryl type resins, epoxy type resins, polyamide resins, butadiene type resins, urethane elastomers, and isocyanate hardenable resins. The degree of polymerization thereof is preferably from 100 to 10,000. The thermosetting resins are preferred in view of durability. The above-described binders are used alone or in combination.

The binder used in the upper magnetic layer is preferably used in an amount of from 10 to 100 parts by weight, more preferably from 15 to 50 parts by weight, per 100 parts by weight of the ferromagnetic particles.

The ferromagnetic particles used in the magnetic layer of the present invention include cobalt coated ferromagnetic iron oxide particles, ferromagnetic chromium dioxide particles, ferromagnetic metal particles, and barium ferrite.

The ferromagnetic particles used are preferably acicular and have an acicular ratio of preferably from 2/1 to 20/1, more preferably from 5/1 to 20/1, and have an average length (long axis length) is preferably from 0.1 to 2.0 μm.

The shape of ferromagnetic particles is not limited only to acicular shape, but may be a granular shape, plate-like shaped, and the like.

When ferromagnetic metal particles are used, 75 wt% or more (preferably 80 wt% or more) of the metal content in the ferromagnetic metal particles is preferably a ferromagnetic metal or an alloy such as Fe, Co, Ni, Fe-Co, Fe-Ni, Co-Ni, or Fe-Co-Ni having a long axis length of 1.0 μm or less.

The coercive force (Hc) of the ferromagnetic particles is preferably from 350 to 5,000 Oe, more preferably from 600 to 2,500 Oe, and most preferably from 600 to 2,000 Oe. When the coercive force is less than 350 Oe, outputs at short wavelength regions decrease. When it is more than 500 Oe, recording can not be carried out with a normal magnetic head.

The thickness of the magnetic layer is preferably 2 μm or less, more preferably 1.0 μm or less, because thickness loss decreases, which is favorable for the electromagnetic properties.

Additives such as lubricating agents, abrasive agents, dispersing agents, antistatic agents, or rustpreventing agents, which are generally used in this art, can be added into the magnetic layer of the present invention.

The binders and non-magnetic particles for the underlayer, and the binders, ferromagnetic particles and, if necessary, various additives are mixed and kneaded with organic solvents respectively to prepare coating solution for the underlayers and that for the upper layers.

The organic solvents used upon mixing, kneading, dispersing, and coating the coating solutions include ketones such as acetone, methyl ethyl ketone, methyl isobutyl ketone, or cyclohexanone; esters such as methyl acetate, ethyl acetate, butyl acetate, ethyl lactate, or monoethyl ether of glycol acetate; ethers such as ethyl ether, glycol dimethyl ether, glycol monoethyl ether, dioxane, or tetrahydrofuran; aromatic hydrocarbons such as benzene, toluene, or xylene; and chlorinated hydrocarbons such as methylene chloride, ethylene chloride, carbon tetrachloride, chloroform, ethylene chlorohydrin, or dichlorobenzene.

The materials for the support used in the present invention include polyesters such as polyethylene terephthalate or polyethylene 2,6-naphthalate; polyolefins such as polyethylene or polypropylene; cellulose derivatives such as cellulose triacetate; and plastics such as polycarbonate, polyimide, or polyamide imide.

A backing layer may be provided on the support surface opposite to the magnetic layer.

In the present invention, the coating solution for the underlayers and that for the upper layer are coated on the non-magnetic support by a so-called wet-on-wet coating method wherein both solutions are multi-layered while they are undried.

The wet-on-wet coating method employed for providing both underlayer an upper layer in the present invention includes a sequential coating method wherein a first layer is provided and immediately thereafter a second layer is also provided while the first layer is wet and a simultaneously multicoating extrusion coating method wherein multilayers are simultaneously provided.

The method for preparing a magnetic recording medium as disclosed in Japanese patent application (OPI) 139929/86 (the term "OPI" used herein means an unexamined published application) can be applied as the wet-on-wet coating method.

FIG. 1 shows an exemplary apparatus to explain a sequential coating method for providing two layers. A coating solution (a) 2 for an underlayer is precoated on a flexible support 1 such as a polyethylene terephthalate film which travels continuously by a coating device (A) 3. Immediately thereafter, the coated surface of the support undergoes a smoothing treatment by a smoothing roll 4. While the above coating solution (a) 2 is wet, a coating solution (b) is extruded from the extrusion coating device (B) 6 and is coated thereon.

Figure 2:
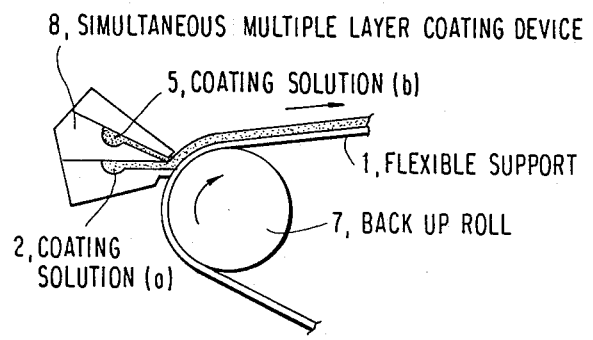
FIG. 2 is a drawing explaining a multiple simultaneously coating method.

FIG. 2 shows an exemplary apparatus to explain an extrusion type simultaneously multicoating method for providing two layers. A coating solution (a) 2 and a coating solution (b) 5 for an upper layer are simultaneously coated on a plastic support 1 through a simultaneous multiple layer coating device for supplying solutions. The support having provided thereon two layers undergoes magnetic orientation, drying and smoothing treatment to obtain a magnetic recording medium. 7 indicates a backup roll.

The present invention will be illustrated in more detail by the following Examples.

EXAMPLE

The coating solution B for under layer for comparison containing the following hardenable binders and compositions and the coating solution A for an under layer of the present invention containing the following non-hardenable binders (thermoplastic) were prepared.

| Coating solution A for underlayer | |
|---|---|
| α-Fe₂O₃ | 100 parts |
| Copolymer of vinyl chloride and vinyl acetate (content of sulfonic acid group: 0.25%) | 20 parts |
| Polyester polyurethane (content of sulfonic acid group 0.1%) | 5 parts |
| Myristic acid (for industrial use) | 2 parts |
| Butyl stearate (for industrial use) | 1 part |
| Electroconductive carbon (10 mμ) | 10 parts |
| Methyl ethyl ketone/cyclohexanone = 7/3 solvent | 250 parts |

| Coating solution B for upper layer | |
|---|---|
| α-Fe₂O₃ | 100 parts |
| Copolymer of vinyl chloride and vinyl acetate (content of sulfonic acid group 0.25% Polymerization degree 400) | 15 parts |
| Polyester polyurethane (content of sulfonic acid group 0.1%) | 5 parts |
| Polyisocyanate (Collonate L-75) | 6.7 parts |
| Myristic acid (for industrial use) | 2 parts |
| Butyl stearate (for industrial use) | 1 part |
| Electroconductive carbon (10 mμ) | 10 parts |
| Methyl ethyl ketone/cyclohexanone = 7/3 solvent | 250 parts |

Two magnetic coating solutions were prepared as follows.

| Coating solution a for upper layer | |
|---|---|
| Co-γ-FeOX (x = 1.46, coercive force 850 Oe, average axis length 0.28 μm, crystal size 240 Å) | 100 parts |
| Copolymer of vinyl chloride and vinyl acetate (content of sulfonic acid group 0.25%) | 15 parts |
| Polyester polyurethane (content of sulfonic acid group 0.1%) | 5 parts |
| Polyisocyanate (Collonate L-75, trade name of polyisocyanate produced by Nippon polyurethane Industries Co., Ltd.) | 6.7 parts |
| Myristic acid (for industrial use) | 2 parts |
| Butyl stearate (for industrial use) | 2 parts |
| α-alumina (particle size 0.1 μm) | 3 parts |
| Electroconductive carbon (10 mμ) | 1 part |
| Methyl ethyl ketone/cyclohexanone = 7/3 solvent | 250 parts |

| Coating solution b for upper layer | |
|---|---|
| Fe—Zn—Ni alloy (coercive force 1,500 Oe, average axis length 0.21 μm, crystal size 200 Å) | 100 parts |
| Copolymer of vinyl chloride and vinyl acetate (content of sulfonic acid group 0.25%) | 15 parts |
| Polyester polyurethane (content of sulfonic acid group 0.1%) | 5 parts |
| Polyisocyanate (Collonate L-75) | 6.7 parts |
| Myristic acid (for industrial use) | 2 parts |
| Butyl stearate (for industrial use) | 1 part |
| α-alumina (particle size 0.1 μm) | 5 parts |
| Methyl ethyl ketone/cyclohexanone = 7/3 solvent | 250 parts |

Single layers or multilayers were provided using the above described coating solutions. The multilayers were provided by the simultaneous multicoating method as shown in FIG. 2.

Combinations of coating solutions and the results of evaluation are shown in the following Table.

The support used in this example was polyethylene terephthalate having 14 μm thickness.

In Table, Samples Nos. 1 to 5 are embodiments of the present invention and Sample Nos. C-1 to C-5 are samples for comparison.

VS (dB)

The video sensitivity at 8 MHz was measured by using an amorphous magnetic head and is shown in terms of relative values when C-4 tape is assumed to have a value of 0 dB.

C/N (dB)

The carrier/noise ratio wherein the noise level was measured at a point 0.1 MHz apart from 8 MHz with respect to the sensitivity at 8 MHz was measured, and is shown in terms of relative values when C-4 tape is assumed to have a value of 0 dB.

Still life

Still life was evaluated in terms of a period of time for S/N of the images at a still mode to decrease by 6 dB.

Head wear (μm)

Head wear was evaluated after the medium (tape) ran for 100 hours.

Adhesiveness

Adhesiveness between a magnetic layer and a support or adhesiveness between a magnetic layer+non-magnetic layer and a support.
A: 100 g or more
B: 50 to 99 g
C: 49 g or less

TABLE

| Sample No. | Coating solution for upper layer | Coating solution for underlayer | Upper layer thickness (μm) | Underlayer thickness (μm) | VS (dB) | C/N (dB) | Still life (min.) | Head wear-out (μm) | Adhesiveness |
|---|---|---|---|---|---|---|---|---|---|
| C-1 | a | — | 2 | — | 0.3 | 0.4 | 50 | 9 | C |
| C-2 | a | A | 2 | 0.2 | 0.4 | 0.2 | 60 | 9 | B |
| 1 | a | A | 2 | 0.5 | 0.9 | 1.0 | 100 | 6 | A |
| 2 | a | A | 2 | 3 | 1.2 | 1.4 | 120 | 5 | A |
| 3 | a | A | 1 | 3 | 1.8 | 2.1 | 120 | 4 | A |
| 4 | a | A | 0.5 | 3 | 2.3 | 2.6 | 120 | 4 | A |
| C-3 | a | B | 1 | 3 | 1.5 | 1.8 | 50 | 9 | C |
| 5 | b | A | 1 | 3 | 8.0 | 8.3 | 110 | 2 | A |
| C-4 | a | — | 5 | — | 0.0 | 0.0 | 120 | 5 | C |
| C-5 | b | — | 5 | — | 5.8 | 5.3 | 90 | 3 | C |
| C-6 | b | B | 1 | 3 | 6.4 | 6.8 | 50 | 6 | C |
| C-7 | a or b | A (wet-on-dry Method) | | | Evaluation was impossible because of poor surface property. | | | | |

It is clear from the results in Table above that the samples of the present invention (Sample Nos. 1 to 5) having an underlayer comprising a non-hardenable thermoplastic binder exhibited excellent electromagnetic properties, still, head-wear-out, and adhesiveness in comparison to the comparative samples having no underlayer (Sample Nos. C-1, C-4 and C-5) and the comparative sample having an underlayer comprising a hardenable binder (Sample No. C-3). The comparative sample having an underlayer comprising thermoplastic binders and having a thickness of 0.2 μm (Sample No. C-2) exhibited a little better adhesiveness than the above-described comparative samples, but was inferior to the sample of the present invention having an underlayer having a thickness of 0.5 μm or more in electromagnetic properties, still life, and head wear-out characteristics.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having provided thereon an underlayer containing non-magnetic particles and a binder and an upper layer containing ferromagnetic particles and a binder, has a light transmission degree of 10% or less at 900 nm and has a dry thickness of 0.5 μm or more, wherein said underlayer and said upper layer are provided on said non-magnetic support by a wet-on-wet simultaneous coating method or a wet-on-wet sequential coating method, and wherein said thermoplastic binder in said underlayer is used in an amount of from 10 to 200 parts by weight per 100 parts by weight of non-magnetic particles in said underlayer.

2. A magnetic recording medium as claimed in claim 1, wherein said thermoplastic binder is a vinyl chloride/vinyl acetate copolymer resin containing functional groups, a polyurethane resin, or a polyurethane resin containing functional groups.

3. A magnetic recording medium as claimed in claim 2, wherein said functional groups are selected from —SO₃M, —COOM, —OM, —OSO₃M, and

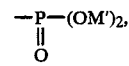

wherein M represents a hydrogen atom or an alkali metal atom, M' represents a hydrogen atom, an alkali metal, or a hydrocarbon group.

4. A magnetic recording medium as claimed in claim 1, wherein when said non-magnetic particles are carbon black, $CaCO_3$, titanium oxide, barium sulfate, $\alpha$-$Al_2O_3$, $\alpha$-iron oxide, $\gamma$-iron oxide, polyethylene particles, or benzoguanamine resin particles.

5. A magnetic recording medium as claimed in claim 1, wherein when said non-magnetic particles are non-acicular, they have an average diameter of from 1 to 500 mμ, and when they are acicular, they have an average long axis of from 100 mμ to 3 μm and an average short axis of from 1 to 500 mμ.

6. A magnetic recording medium as claimed in claim 1, wherein said thermoplastic binder in said underlayer is used in an amount of from 20 to 100 parts by weight per 100 parts by weight of said non-magnetic particles in said underlayer.

7. A magnetic recording medium as claimed in claim 1, wherein said underlayer and upper layer are provided on said non-magnetic support by a wet-on-wet simultaneous coating method.

8. A magnetic recording medium as claimed in claim 1, wherein said underlayer and upper layer are provided on said non-magnetic support by a wet-on-wet sequential coating method.

* * * * *

UNITED STATES PATENT AND TRADEMARK OFFICE
CERTIFICATE OF CORRECTION

PATENT NO. : 4,963,433
DATED : Oct. 16, 1990
INVENTOR(S) : Ogawa et al

It is certified that error appears in the above-indentified patent and that said Letters Patent is hereby corrected as shown below:

Col. 7, line 62, after "binder," insert --wherein said underlayer contains a thermoplastic binder--

Signed and Sealed this

Twelfth Day of April, 1994

Attest:

BRUCE LEHMAN

Attesting Officer

Commissioner of Patents and Trademarks